United States Patent [19]

Decker

[11] 3,952,517

[45] Apr. 27, 1976

[54] BUOYANT RAM MOTOR AND PUMPING SYSTEM

[76] Inventor: Bert J. Decker, 136 Capen Blvd., Buffalo, N.Y. 14226

[22] Filed: Oct. 3, 1973

[21] Appl. No.: 403,111

[52] U.S. Cl. .................................. 60/502; 417/337
[51] Int. Cl.² ........................................ F03B 13/12
[58] Field of Search ............ 60/495, 496, 502, 503; 417/337

[56] References Cited
UNITED STATES PATENTS

| | | | |
|---|---|---|---|
| 1,058,785 | 4/1913 | Nevers | 60/496 |
| 1,773,189 | 8/1930 | Lecrenier | 60/503 |
| 3,485,038 | 12/1969 | Martin et al. | 417/337 X |

FOREIGN PATENTS OR APPLICATIONS

| | | | |
|---|---|---|---|
| 1,250,609 | 11/1959 | France | 417/337 |

*Primary Examiner*—Allen M. Ostrager
*Attorney, Agent, or Firm*—Raymond F. Kramer

[57] ABSTRACT

A buoyant ram motor comprising a hollow buoyant ram element movable within a housing into which liquid such as water is admitted in a manner applying a buoyant force to the ram and moving or lifting it up along the interior of the housing. After each power stroke, the liquid is removed from the housing to lower or return the ram to an initial or starting position for the next power stroke. The liquid for moving the ram can be obtained from natural water bodies. The force applied to the ram during each power stroke is augmented by providing a vacuum in the housing on and exposed to the surface of the ram opposite the surface to which the buoyant force is applied. During each return stroke, liquid is removed from beneath the ram in a manner preserving the vacuum over the ram. This is accomplished by an arrangement including a chamber communicating with the liquid below the ram and containing a weighted cylinder supported on a flexible container filled with compressed air. The reactive force of the container and weighted cylinder pressurizes the liquid to above one atmosphere, thereby forcing it out from under the ram and into the atmosphere. The movement of the ram does useful work such as reciprocating a piston in a cylinder to pump liquid. The motor can be used as a pump in a system wherein water is lifted or pumped to a relatively great height from where the water is dropped through a turbine to drive an electrical generator.

1 Claim, 9 Drawing Figures

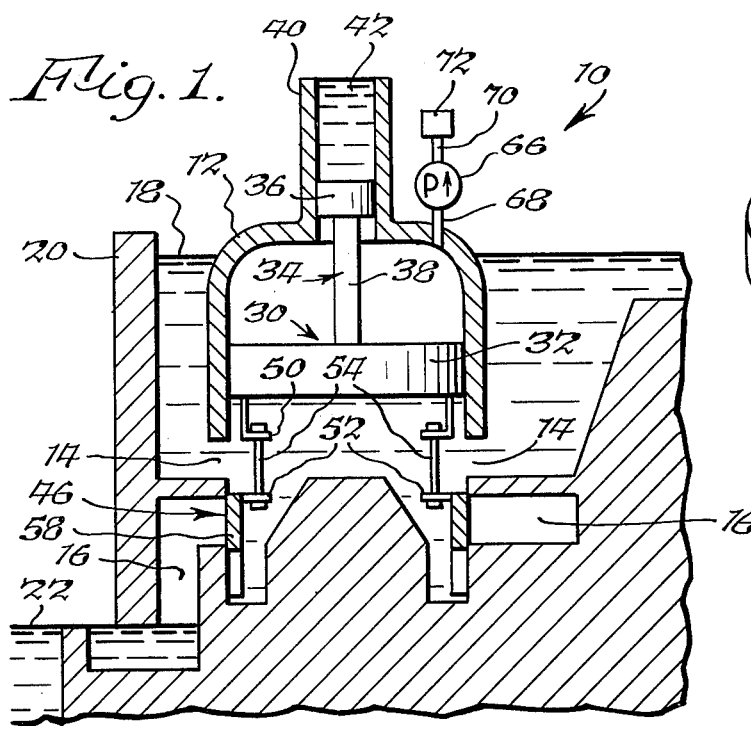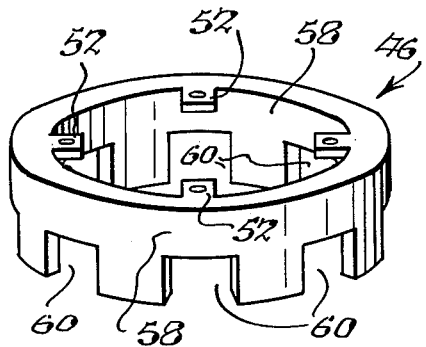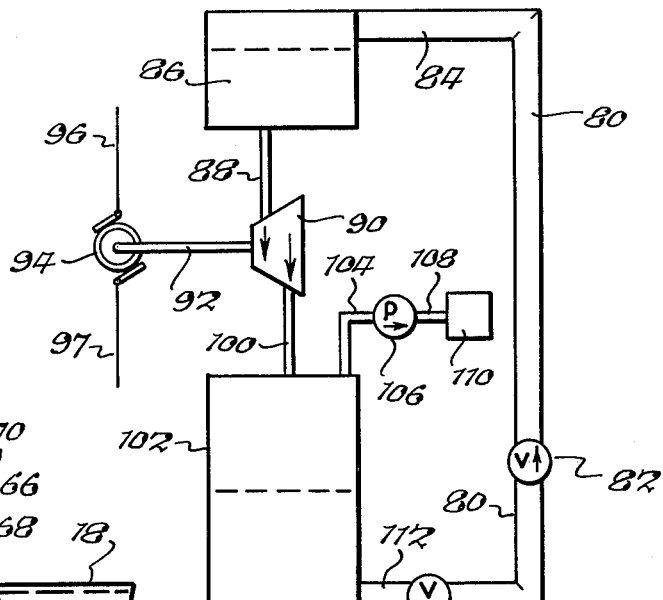

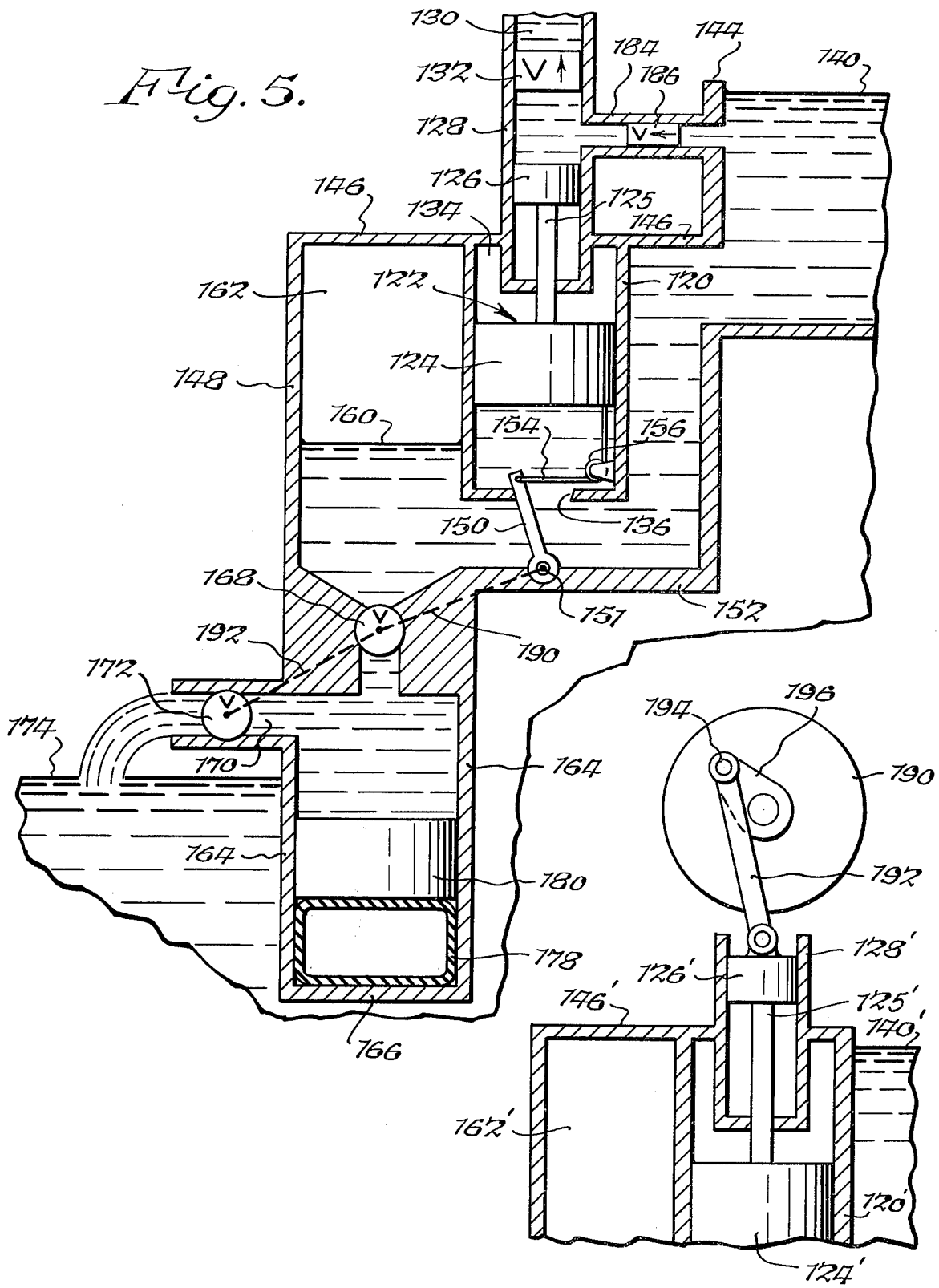

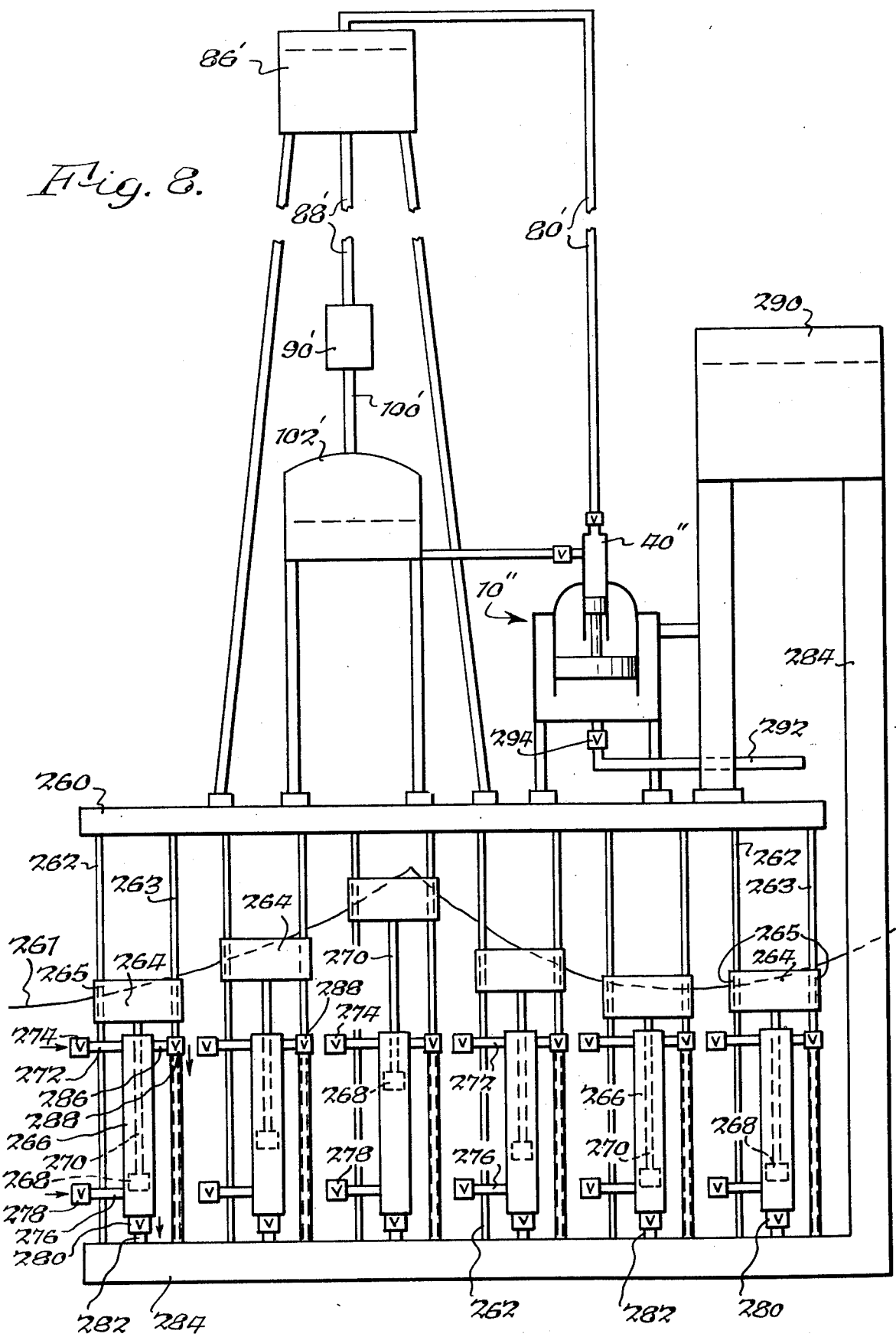

BUOYANT RAM MOTOR AND PUMPING SYSTEM

BACKGROUND OF THE INVENTION

This invention relates to the art of fluid power systems, and more particularly to a novel buoyant ram motor and pumping system.

Present day power generating systems wherein the burning of a combustible fuel to release energy to do useful work, such as driving a generator to produce electricity, face two problems or obstacles of increasing magnitude. One is that combustion of such fuels releases contaminants which are harmful to humans, animals and the environment. Another is that increasing demands for energy are rapidly depleting known sources and reserves of such fuels.

The natural bodies of water on the earth have energy which it would be desirable to use to avoid the above-mentioned problems. In particular, there is available the potential energy in two adjacent water bodies at different levels or heights, the kinetic energy in moving bodies of water and the energy provided by atmospheric pressure. It would be highly desirable to provide a system for converting these forms of energy into useful work because of the abundance of such water bodies and the atmosphere and the absence of any adverse environmental effects from utilizing the energy therein.

SUMMARY OF THE INVENTION

It is, therefore, an object of this invention to provide a new and improved motor which does not require the burning of a combustible fuel for its operation.

It is a more particular object of this invention to provide such a motor which utilizes the energy in natural water bodies for operation thereof.

It is a more particular object of this invention to provide such a motor which converts the force from a relatively low water drop into mechanical output motion for doing useful work.

It is a further object of this invention to provide such a motor which utilizes atmospheric pressure to significantly increase the work done by a relatively low water drop.

It is a further object of this invention to provide such a motor in a system which utilizes the energy in a moving body of water to operate the motor for providing mechanical output motion for doing useful work.

It is a further object of this invention to provide a new and improved motor and pumping system utilizing the energy in natural water bodies for use in a system for generating electricity.

It is a further object of this invention to provide such a motor in a power generation system which is efficient in operation and relatively simple in construction.

The present invention provides a buoyant ram motor comprising a hollow buoyant ram element movable within a chamber into which liquid such as water is admitted in a manner applying a buoyant force to the ram and moving it in the chamber. After each power stroke, the liquid is removed from the chamber to return the ram to an initial or starting position for the next power stroke. The liquid for moving the ram can be obtained from natural water bodies. The force applied to the ram during each power stroke is augmented by providing a vacuum in the chamber over the ram. This vacuum is preserved during the return stroke of the ram as liquid is removed from the chamber. The mechanical motion provided by the moving ram is utilized for doing useful work, such as pumping or lifting a liquid to a relatively great height from which it is dropped through a turbine for driving an electrical generator.

The foregoing and additional advantages and characterizing features of the present invention will become clearly apparent from a reading of the ensuing detailed description together with the included drawing therein:

BRIEF DESCRIPTION OF THE DRAWING FIGURES

FIG. 1 is a sectional view, partly diagrammatic, of a buoyant ram motor and pumping system according to the present invention as it would appear at one point during a cycle of operation thereof;

FIG. 2 is a perspective view of a flow control or valve element included in the apparatus of FIG. 1;

FIG. 3 is a sectional view, partly diagrammatic, illustrating the apparatus of FIG. 1 at another point in the operating cycle thereof;

FIG. 4 is a schematic diagram of an electricity generating system utilizing the apparatus of the present invention;

FIG. 5 is a sectional view, partly diagrammatic, of a buoyant ram motor and pumping system according to another embodiment of the present invention;

FIG. 6 is a fragmentary sectional view, partly diagrammatic, illustrating an alternative arrangement of the apparatus of FIG. 5;

FIG. 8 is a partially cutaway elevational view, partly diagrammatic, of a buoyant ram motor and pumping system according to another embodiment of the present invention which utilizes the energy of a moving natural body of water.

DETAILED DESCRIPTION OF THE ILLUSTRATED EMBODIMENTS

Figure 7:
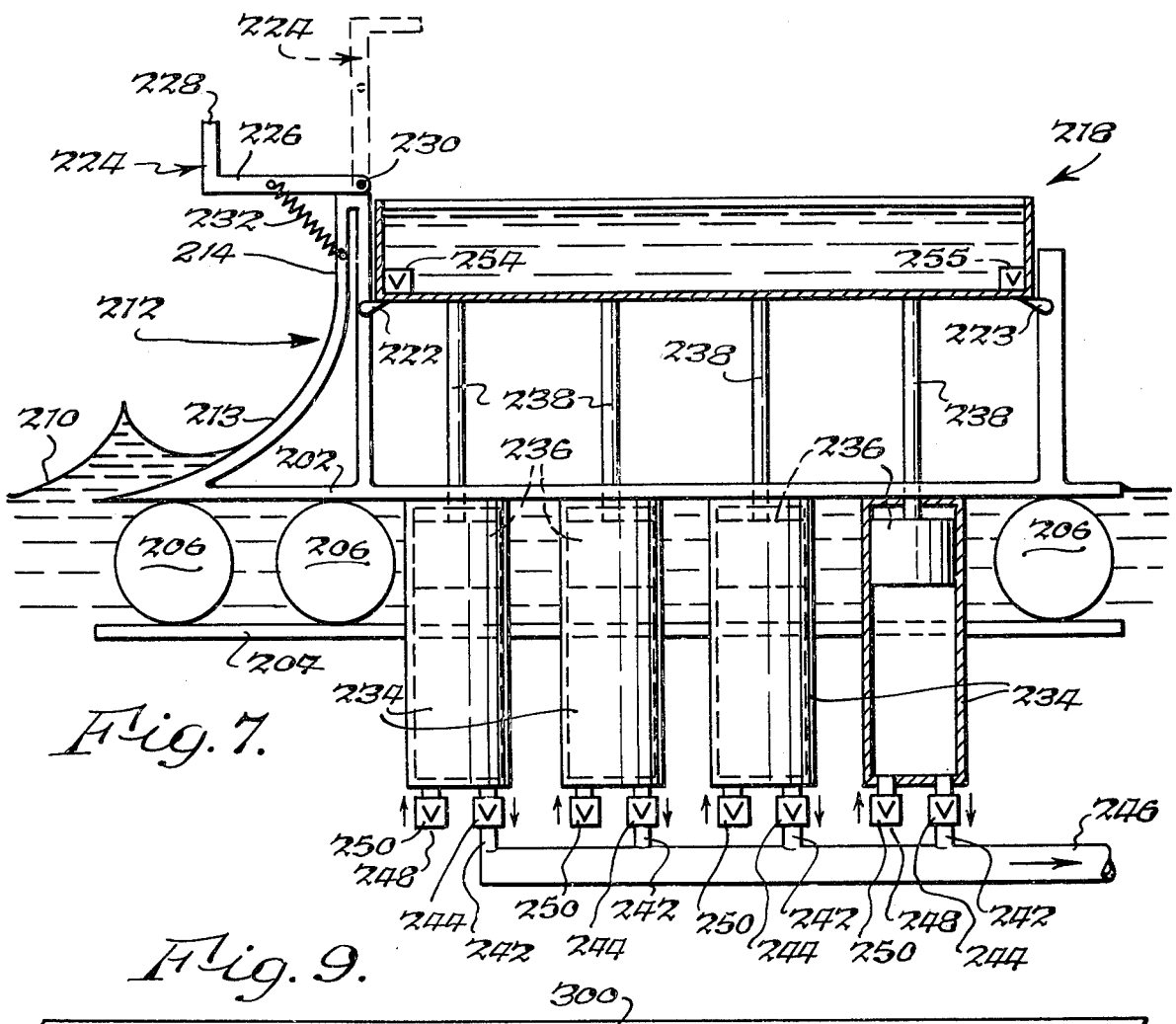
FIG. 7 is a sectional view, partly diagrammatic, of a buoyant ram motor and pumping system according to another embodiment of the present invention which utilizes the energy of a moving natural body of water.

FIGS. 1 and 3 are diagrammatic views illustrating a buoyancy ram pump at two different positions during a cycle of operation thereof. Referring first to FIG. 1, the pump, generally designated 10 includes a housing 12 for containing liquid and having inlet passages 14 and an outlet passage 16. Housing 12 preferably is generally cylindrical in shape and liquid is delivered to the interior of housing 12 through inlet passages 14 in a circumferential manner from a suitable supply of liquid generally designated 18 in FIG. 1. In the present instance supply 18 is a body of water such as a river or lake contained by a dam indicated diagrammatically at 20. The supply 18 alternatively can comprise a tank or other suitable reservoir containing liquid or can have various other forms, as will be mentioned further on in the specification. In the illustration of FIG. 1, housing 12 is disposed generally vertically and is located on the upstream side of dam 20 with inlet passage 14 located well below the level of water 18. Outlet passage 16 leads from the lower or bottom portion of housing 12 whereby when the outlet is open liquid will leave housing 12 under the influence of gravity. In the present instance, outlet passage 16 communicates with a body of water 22 on the downstream side of dam 20. The outlet passage 16 is closed from the interior of housing 12 at the beginning of each cycle of operation by suitable flow control means which will be described in detail presently.

Pump 10 according to the present invention further comprises a ram generally designated 30 having a buoyant portion 32 movable within the chamber or interior region of housing 12 under the influence of liquid therein and an output portion 34 extending from buoyant portion 32 and from which output mechanical motion is obtained. In the present instance portion 34 comprises a piston 36 fixed to buoyant portion 32 by a rod 38 and movable in a cylinder 40 against fluid 42 to be pumped. In the present instance piston 36 is slidably received in a cylindrical extension 40 of housing 12 which contains liquid 42 therein upon which it is desired to exert a motive force in response to operation of pump 10. Thus pump 10 of the present invention, as shown in FIG. 1, can be used in combination with various types of systems wherein a liquid similar to liquid 42 is to be moved or pumped, thereby performing useful work, and various examples of such systems will be described further on in the specification. The buoyant portion 32 of ram 30 is hollow and can have various shapes and is dimensioned relative to the amount of water contained in housing 12 so as to have the desired degree of buoyancy. In the present instance the buoyant portion 32 has a relatively large diameter, measured in the horizontal direction as viewed in FIG. 1, and a relatively smaller width or height measured in a vertical direction as viewed in FIG. 1. It is to be understood, however, that buoyant portion 32 can have various shapes, the only constraint being the overall size or volume relative to the weight of liquid which it is to displace. Piston 36 is shaped and sized according to conventional piston design and in most instances will be solid. Likewise rod 38 connecting piston 36 with the ram bouyant portion 32 is of conventional construction. In some situations it may be necessary to provide a fluid-tight seal between piston 36 and the inner surface of cylinder 40, and therefore a conventional annular groove or series thereof fitted with O-rings of sealing material can be provided in piston 36 in a well-known manner.

Pump 10 according to the present invention further comprises flow control or valve means for opening the housing inlet passage 14 and closing the housing outlet passage 16 during the ram power stroke and then closing passage 14 and opening passage 16 during the ram return stroke. As shown in FIG. 1 the flow control or valve means comprises an annular element 46 depending from ram buoyant portion 32 and connected thereto by suitable means. As shown in FIG. 1, ram buoyant portion 32 is provided with a plurality of bracket members 50 and corresponding brackets 52 are provided on ring 46. The brackets 40 and 52 can be joined together by bolts 54 or equivalent connectors. Valve element 46 has sufficient diameter and height or length so as to seal the interior of housing 12 from outlet passage 16 at the beginning of a ram power stroke which is the position of FIG. 1. Valve element 46 is shown in further detail in FIG. 2 and is generally ring-shaped, having a solid or continuous portion 58 comprising about one half the operative surface thereof. As viewed in FIG. 1, portion 58 comprises the upper half of element 46, extending for about one-half the height or axial length thereof, and is coextensive with the surface of the opening of passage 16 thereby sealing the same. The other portion of the surface of element 46 is provided with circumferentially spaced openings 60 of substantial area. When valve element 46 is raised from the position of FIG. 1, openings 60 therein will communicate with pasage 16, thereby placing the interior of housing 12 in fluid communication with outlet passage 16, as will be described in detail presently.

The pump 10 of the present invention further includes means for creating a vacuum within housing 12 in the region which is not occupied by ram 30 and the liquid. A vacuum pump 66 is connected by a conduit 68 to the interior of housing 12 near cylindrical extension 40. Pump 66 also is connected by a conduit 70 to a reservoir or tank 72. The reason for providing a vacuum in housing 12 will be explained in detail presently.

As the liquid or water 18 enters housing 12 through passage 14 and begins to fill the interior thereof, the liquid exerts a buoyant force on ram 30 moving or lifting it in a vertical or upward direction, as viewed in FIGS. 1 and 3. Atmospheric pressure is acting on the surface of the body of water 18. The upward movement of ram 30 away from the position of FIG. 1, causing a corresponding movement of piston 36, is the ram power stroke. FIG. 3 illustrates the pump of FIG. 1 at a point in the operating cycle thereof wherein the buoyant ram 30 has reached the end or termination of a power stroke. The apparatus of FIG. 3 is identical in construction to that of FIG. 1 and therefore like numerals are used to designate components thereof. Ram 30 has moved to a position in FIG. 3 with buoyant portion 32 in proximity to or adjacent the end of housing 12 from which cylinder 40 extends and with piston 36 moved axially along cylinder 40 and thereby having moved or pumped the fluid 42 in cylinder 40. At this point in the operating cycle, the flow control means or valve element 46 has been raised by movement of ram 30 to a position where the solid portion 58 thereof closes inlet passage 14 and therefore stops the flow of liquid into housing 12. At the same time openings 60 of valve element 56 are in registry with outlet passage 16, thereby allowing liquid previously contained in housing 12 behind the ram 30 to leave housing 12 through outlet passage 16, thereby causing the eventual return of ram 30 to an initial or starting position for the beginning of the next power stroke.

The present invention utilizes two principles of fluid mechanics. One principle is buoyancy, as exemplified by the tendency of an empty barrel placed under water to force itself upward with a force in pounds equal to the weight of water which the barrel displaces less the weight of the barrel. The other principle relates to increasing the capability of a force applied to a liquid to lift the liquid up a column by placing a vacuum over the liquid at the upper end of the column. This is exemplified by the theoretical capability of 1 pound of water dropped a distance of 1 foot under atmospheric pressure to lift about 32 pounds of water a distance of 1 foot in a vacuum.

In the apparatus of the present invention, the tendency of buoyant ram 30 to force itself upwardly as water enters housing 12 is increased or enhanced by placing a vacuum over the buoyant portion 32 of ram 30. Thus the net upward force of ram 30 is equal to the weight of the volume of water it displaces in housing 12 less the weight of the ram itself and plus the weight of atmospheric air pressure or similar positive pressure acting downwardly on the body of water 18. In the apparatus of the present invention, with the provision of a vacuum in housing 12, there is no force due to air pressure or other positive pressure acting downwardly on ram 30. The vacuum is protected by forming outlet passage 16 in the manner shown in FIG. 1 and by having water level 22 located 32 feet below the opening of passage 16 to the interior of housing 12. The 32 foot drop prevents atmospheric pressure on water body 22 from acting against the downward return of ram 30.

The following example is believed to be helpful in further illustrating the principles of the present invention. With buoyant portion 32 of ram 30 having a radius of 3 feet and a height or axial length of 2 feet, the displacement is 3532.5 pounds of water and the weight of the ram is 323 pounds. The buoyant lift is 3200 pounds and the vacuum lift is 59,801 pounds thereby giving a total or net lift of 63,001 pounds in the present example. The vacuum lift is determined by noting that atmospheric pressure acts on water body 18 with a force of 14.69 pounds per square inch, and therefore this gives rise to an upward force on ram 30 equal to 14.69 pounds per square inch times the horizontal surface area of the ram buoyant portion 32. If the opposite or upper surface of ram buoyant portion 32 were exposed to atmospheric pressure there would be an equal force acting downwardly on ram 30 thereby resulting in a zero net force on ram 30 from atmospheric pressure. In the apparatus of the present invention, however, the vacuum provided over ram buoyant portion 32 gives no downward force and therefore a net upward force acts on ram 30, in addition to the buoyant force, which upward force equals atmospheric pressure times the horizontal surface area of ram buoyant portion 32 exposed to water 18. In addition, the surface area of piston 36 and diameter of cylinder 40 are considerably smaller than the surface area and diameter of ram buoyant portion 32, thereby allowing the pump to lift liquid to a relatively great height, in any event more than 32 feet.

In the present example, housing 12 can have an inner diameter of about 6 feet, being slightly larger than that of ram buoyant portion 32 to allow movement therein, and housing 12 can have an axial length or height of about 3 feet. This provides a ram power stroke of a distance or length of 1 foot. The total lift of 63,001 pounds provided by ram 30 on each power stroke thereof can be used to lift water in a 1 foot diameter pipe having a total length or height of 1000 feet because the total water load is only 48,940 pounds. In a pump 10 operating according to the foregoing example, each operating cycle including a power stroke and a return stroke would have a time of about 8 seconds.

FIG. 4 illustrates the manner in which the pump of the present invention can be used in a system for generating electricity. The pump in the system of FIG. 4 is identical to pump 10 shown in FIGS. 1 and 3 and therefore the elements thereof are given the same reference numerals but provided with a prime designation. Furthermore, many components of the arrangement of FIGS. 1–3 have been omitted for simplicity in illustration but it is to be understood that they will be present in an actual system. Thus the pump is designated 10' and receives liquid (water) through an inlet from a reservoir or supply 18', and pump 10' has an outlet leading to another reservoir 22' below reservoir 18'. Pump 10' takes in water from reservoir 18' during each power stroke of the buoyant ram and it exhausts water to reservoir 22' during each return stroke thereof. By way of example, reservoir 18' could comprise a river or body of water confined by a dam 20', and pump 10' would be positioned adjacent dam 20' on the upstream side and disposed in the body of water 18', so that the top level of the ram of pump 10' at the greatest extent of its travel would be lower than the surface or level of the body of water 18'. The outlet of pump 10' would communicate with the body of water 22' on the downstream side of dam 20'.

Conduit 79 leading from pump 10' and containing the piston operated by the ram together with fluid to be pumped, is connected to a first system conduit means 80 which will be disposed generally vertically in an actual system and which contains a one way valve means 82 permitting flow of fluid such as water only in a direction away from pump 10', and as viewed in FIG. 4, in a vertical direction. While conduit means 80 in FIG. 4 is shown as a single conduit, it could comprise a plurality of conduits or pipes, in which instance a corresponding number of conduits 79, cylinders 40' and pistons movable therein would be provided in pump 10' with all the pistons being connected to a single ram. In such an arrangement the cylinders leading from the upper end of the pump housing would be spaced circumferentially about the housing axis.

Conduit means 80 communicates with a branch conduit 84 leading to the inlet of a tank or reservoir 86. Thus fluid pumped in an upward direction along conduit means 80 is contained and accumulates within reservoir 86. An outlet of reservoir 86 is connected by means of a conduit 88 to one input of a turbine 90 positioned below reservoir 86 whereby fluid or water flows from reservoir 86 under the influence of gravity through turbine 90, thereby driving the same. Turbine 90 is connected by means of an output shaft means 92 to an electrical generator 94 which, when driven by turbine 90, produces an electromotive force on the output lines 96, 97. Fluid or water leaving turbine 90 is conducted by a conduit 100 to the inlet of a second tank or reservoir 102. The interior of tank 102 is closed to the atmosphere, and the region adjacent the upper end thereof is connected by means of a conduit 104 to a vacuum pump 106 which, in turn, is connected by a conduit 108 to a tank or reservoir 110. The fluid or water accumulated within tank 102 flows through a conduit means 112 back to the conduit means 80 and conduit 112 includes a one way valve 114, whereby the flow of fluid or water is only permitted in a direction away from reservoir 102 and toward conduit means 80. Thus, the fluid power system includes a closed circuit or system portion containing the described components.

The system of FIG. 4 operates in the following manner. Reservoir 86 is located a relatively great height above the body of water 18' and pump 10'. For example the height of reservoir 86 above sea level would be about 550 feet. In one illustrative installation, reservoir 86 could be located at or near the top of a mountain near the water bodies 18' and 22'. In another installation reservoir 86 could be located at or near the top of a building in a city adjacent the water bodies. During each power stroke of the buoyant ram in pump 10' the system fluid, which preferably is water, is forced upwardly through conduit means 80 through the one way valve 82, which prevents a return or downward flow of the fluid. At the beginning of system operation, a number of cycles of pump 10' will be required to lift water up to the reservoir 86. Once water accumulates therein it drops through conduit means 88 and through turbine 90, which is located adjacent reservoir 102 and thus at a considerably great height below reservoir 86. The water falling from reservoir 86 at a relatively high velocity drives turbine 90 at high speed to operate generator 94 in a known manner. Water leaving turbine 90 through conduit 100 is accumulated in reservoir 102 and the interior thereof is maintained under vacuum to provide more pressure on turbine 90. During each return stroke of the piston of pump 10', fluid or water is withdrawn from reservoir 102 through conduit 112 and one-way valve 114 back into conduit means 80 wherein it is pumped or lifted again upwardly during the next power stroke of pump 10'.

By way of example, a system as shown in FIG. 4, constructed according to the principles of the present invention, could include a single buoyant ram having eight pistons positioned at 45° angles therearound, each slidably received in a corresponding cylinder similar to cylinder 40'. The eight cylinders 40' would connect with eight conduits like conduit 80 and each including a one way valve similar to valve 82. If each pipe has a diameter of 32 inches and a height of 550 feet, the total water load for the eight pipes would be 1,531,464 pounds. A pump 10' capable of lifting such a load would include a buoyant ram having a diameter of 30 feet and a height or thickness of 1 foot, thereby having a volume of 706.85 cubic feet and a displacement of 44,051 pounds of water. With the weight of the buoyant ram being 4051 pounds, the buoyant lift is 40,000 pounds and the vacuum lift is 1,495,259 pounds, resulting in a total lift of 1,535,260 pounds, which is sufficient to lift the water load in the eight vertical pipes.

According to the present example, conduit 88 leading from reservoir 86 has a diameter of 60 inches, thereby containing 19.634 cubic feet of water per foot of pipe or 1223.65 pounds of water per foot of pipe. This water dropping a distance of about 500 feet into turbine 94 would do so in about 5.6 seconds at an average velocity of 89.44 feet per second or 109,445.6 pounds per second. This results in a force of 54,723,291.6 foot pounds per second, which develops 74,626 Kilowatts of power. However, an additional force acts downwardly on the water dropping through turbine 94. This is because atmospheric pressure or similar positive pressure acting on the water accumulating in reservoir 86 contributes a downward force through conduit 88 which is not counteracted or balanced by an equivalent force due to the fact that a vacuum is provided in the region of reservoir 102 not occupied by water so that the downstream side of turbine 90 is exposed to a vacuum, not to atmospheric or any positive pressure.

This additional force on the system is a function of the cross-sectional area of conduit 88, 2827.43 square inches for a 60 inch diameter pipe, and a function of the air pressure acting thereon. That force of 41,535 pounds provides an additional acceleration. In traditional cases, acceleration is force divided by mass which in the present example would provide the result of 611,825/(611,825/32 ) or 32 feet per second per second. In this situation, however, the acceleration is (611,825 plus 41,535)/(611,825/32) or 34.17 feet per second per second. This acceleration provides a drop time of 5.4 seconds, an average velocity of 92.26 feet per second, pounds per second of 112,900.6, foot pounds per second of 56,450,304 and 76,981 kilowatts, resulting in an increase in system power output.

The buoyant ram motor and pumping system advantageously utilizes a buoyancy barrel and a relatively low water drop, i.e., the difference in water levels 18 and 22, to provide a fuelless motive power means for doing useful work. The fuelless motor of the present invention has many uses, such as lifting or pumping water or other liquids and lifting water to a relatively great height from which it can be dropped through a turbine-generator to generate electricity. The force applied to the buoyant ram and its speed during the power stroke are significantly increased in the apparatus of the present invention by providing a vacuum over the ram, i.e., the vacuum is exposed to a surface of the ram opposite the ram surface on which the buoyant force acts. The apparatus of the present invention provides a useful work output and operates an electricity generation system in a manner which avoids the problems and adverse results associated with conventional methods and apparatus which require burning of combustible fuel. The system of the present invention includes the highly efficient and effective combination of a buoyancy ram vacuum assisted pump and a vacuum assisted turbine generator to generate electricity from a relatively low water drop.

FIG. 5 illustrates a buoyant ram motor according to a second embodiment of the present invention. As in the embodiments of FIGS. 1–4, there is provided a housing 120 which preferably is hollow cylindrical in shape defining an interior chamber and containing a ram 122 including a buoyant drum portion 124 and a piston portion 126 fixed to the buoyant portion 124 by a rod 125. Piston 126 is axially slidably movable along a cylinder and conduit means 128 containing fluid 130 to be pumped. Conduit 128 includes a one-way valve 132 in a manner similar to the arrangement of conduit 80 and valve 82 in the system of FIG. 4. The region 134 in housing 120 above the buoyant drum 124, as viewed in FIG. 5, is evacuated to provide a vacuum therein. This can be done by providing a vacuum pump (not shown) in communication with region 134, as in the embodiment of FIGS. 1–4. Housing 120 is provided with an opening 136 in the bottom or base thereof which serves as both an inlet and outlet for liquid or water entering or leaving housing 120 in a manner which presently will be described.

Housing 120 is suitably located to place the passage or opening 136 in communication with a first body of water 140, the level of which is above the upper portion of the buoyant drum 124 when ram 122 is at the end of a power stroke. In the present arrangement, the body of water 140 is confined by a vertical wall 144 which meets or joins a horizontal wall 146 below the level of water 140, and housing 120 in the present arrangement depends from wall 146. The wall 146 meets or joins a second vertical wall 148 disposed parallel to wall 144 and spaced from housing 120. Water 140 is exposed to the pressure of the atmosphere or other suitable positive pressure, and it flows under the influence of that pressure and gravity through opening 136 and into the interior of housing 120 under control of a valve 150. Valve 150 is of the flip type and comprises a member pivotally connected at one end 151 to a horizontal wall 152 spaced below housing 120. The other end of valve member 150 is operatively connected to ram 122 such as by a line 154 mechanically connected to valve 150 which is directed about a guide 156 and connected to the bottom surface of the buoyant drum 124. When drum 124 is at the lowermost position as viewed in FIG. 5, that is at the beginning of the power stroke of ram 122, valve member 150 is at the left-hand position as shown in FIG. 5 thereby allowing the water 140 to flow through passage 136 and into the interior of housing 120. This, in turn, moves ram buoyant portion 124 in an upward direction similar to the operation of the system of FIGS. 1–4, thereby pulling valve member 150 by means of cord 154 to the right as viewed in FIG. 5 about the pivot 151 and thereby closing passage 136 to the body of water 140 when the ram 122 reaches the end of its power stroke.

As shown in FIG. 5, the body of water 140 also flows into a water storage region defined by walls 146, 148 and 152, and the water reaches a level which is slightly above the bottom or base of housing 120 containing passage 136. This in turn defines a region 162 which is evacuated to provide a vacuum therein. The arrangement of FIG. 5 further comprises a cylindrical housing 164 which is open at the upper end thereof and closed at the bottom or base 166 thereof. The vertical cylindrical walls 164 meet and are joined to the vertical wall 148 and horizontal wall 152 of the structure and a one-way valve 168 is provided adjacent the upper end of the cylinder 164. An outlet or passage 170 is located in the cylindrical wall 164 below valve 168, and another one-way valve 172 is provided at or adjacent passage 170. Passage 170 and valve 172 are positioned slightly above a second body of water 174 which is located at a level below the level of water 140. The body of water 174 is likewise exposed to atmospheric or a suitable positive pressure. With valve 172 being located above water 174, it is pressurized by atmospheric pressure. Located in the bottom region of cylinder 164, as viewed in FIG. 5, and supported by the base or bottom 166 is a container 178 of flexible or resilient material, such as rubber, for containing pressurized air. Positioned adjacent or on top of container 178 is a weighted element in the form of a cylinder 180 adapted for sliding or reciprocable movement within cylinder 164 in a manner which presently will be described.

The motor and pumping system of FIG. 5 operates in the following manner. Valve 150 initially is at the left-hand position, as viewed in FIG. 5, allowing water 140 to flow into cylinder 120, thereby providing a buoyant force on the drum 124 which is augmented by the air pressure acting on water 140, thereby forcing ram 122 in an upward direction. As in the system of FIGS. 1–4, the upward force on ram 122 is increased further due to the fact that a vacuum is provided in the region 134 above the drum 124. The upward movement of ram 122 causes a corresponding movement of piston 126, thereby forcing or lifting the fluid 130, such as water, through conduit 128 in an upward direction, as viewed in FIG. 5. Valve 132 prevents liquid or water which has been lifted by piston 126 from flowing in a downward or return direction when the piston 126 travels in its return or downward stroke. A conduit 184 is provided for connecting an aperture in wall 144 below the level of water 140 and an aperture in conduit 128 between piston 126 and valve 132. Conduit 184 contains a one-way valve 186. Thus water can flow from the body 140 into the piston chamber when piston 126 travels in its downward or return stroke. This water applies weight or force to piston 126, thereby resulting in a relatively faster return stroke of ram 122. The water admitted to the piston chamber on the return stroke is pushed upwardly through valve 132 on the power stroke.

When ram 122 reaches the end of a power stroke, it has moved valve member 150 by means of cord or line 154 to the right-hand position, as previously described, thereby closing passage 136 to the body of water 140. This allows the water contained within housing 120 to leave through passage 136 and pass into the water storage area containing the water 160. Valve 168 is operatively connected to valve 150 as indicated by the broken line 190 and in a manner such that valve 168 is closed when valve 150 is at the left-hand position in FIG. 5, allowing water 140 to enter chamber 120, and valve 168 is opened when valve 150 moves to the right, as viewed in FIG. 5, thereby allowing water to leave housing 120 and to enter the water storage area. Valve 168 also is operatively connected to valve 172, as indicated by the broken line 192, in a manner such that when valve 168 is closed valve 172 is opened and when valve 168 is opened valve 172 is closed.

When valve 168 is opened during the return or downward stroke of ram 122, water 160 from the storage area enters the interior of cylinder 164 thereby increasing the weight or downward force acting on piston 180 and container 178. The pressure within container 178 initially is at atmospheric pressure, i.e. when container 178 is in a neutral unstressed condition. Cylinder 180 is weighted equal to one atmosphere. The weight of the water in cylinder 164 and the predetermined weight of cylinder 180 is sufficient to compress container 178 into a compressed condition. The weighted cylinder 180 serves to prevent the ballon-like container 178 expanding beyond atmospheric pressure due to the fact that the weight of the water alone within cylinder 164 would not be sufficient to overcome atmospheric pressure. Then on the next power stroke of ram 122 when valve 168 is closed and valve 172 is opened, container 178 expands and forces cylinder 180 in an upward direction, thereby forcing water contained within cylinder 164 in a direction through valve 172 and into the body of water 174. The vacuum within region 162 serves to aid the water outflow from housing 120 during the return stroke of ram 122.

The pumping system of FIG. 5 therefore employs the atmospheric or positive air pressure acting on water body 140 to augment the force of the water operatively flowing therein. As a result, more water can be lifted upwardly through conduit 128 than is used within housing 120 due to the fact that the pumping operation is augmented by air pressure. The system of FIG. 5 also has the advantage derived from the provision of a vacuum in region 134 over ram buoyant portion 124 as in the embodiment of FIGS. 1–4. In this embodiment, however, the vacuum is preserved in a manner not requiring a 32 foot drop between the outlet passage and the outlet body of water. This is done with the weighted cylinder 180 supported on the flexible container 178 of compressed air in a manner that its reactive force pressurizes the water to above one atmosphere of pressure, forcing it out from under the vacuum into the atmosphere.

FIG. 6 illustrates an alternative arrangement of the apparatus of FIG. 5. This arrangement provides a different way of obtaining a useful mechanical output from movement of the piston, and all other parts are identical to the apparatus of FIG. 5 and are designated by the same reference numerals provided with a prime superscript. In the embodiments of FIGS. 1–5, reciprocation of the piston in response to movement of the buoyant ram was utilized to pump or lift liquid along a conduit. In the arrangement of FIG. 6 there is provided means to connect reciprocation of piston 126' into rotation of a flywheel 190. Rotation of flywheel 190 can be put to many uses such as driving an electrical generator similar to generator 94 in the system of FIG. 4. A first arm or lever 192 is pivotally connected at one end to the face of piston 126', such as by a ball and socket joint. The other end of lever 192 is rotatably connected by means of a joint or coupling 194 to one end of another arm or lever 196, the opposite end of which is rotatably connected to a shaft through the axis of flywheel 190. The joint or coupling 194 is eccentric with respect to the axis of wheel 190. Joint 194 could, of course, be rotatably connected directly to wheel 190, offset or eccentric with respect to the center thereof, thereby eliminating the need for arm 196. The arrangement of FIG. 6 can of course be used in any of the preceding embodiments to connect the linear reciprocating movement of the buoyant ram to output rotary motion.

FIG. 7 illustrates apparatus according to the present invention which utilizes the kinetic energy of a moving body of water to do useful work. The apparatus is floated on a body of water and to this end there is provided a raft defined in part by spaced apart horizontally disposed platforms 202 and 204 having secured therebetween a plurality of hollow buoyant drums or tanks 206. The raft is weighted and constructed so that the level of the body of water 210 is at or adjacent the plane of the upper platform member 202. It is to be noted that the foregoing is merely illustrative of various types of raft or boat arrangements which can be employed for supporting the apparatus according to the present invention in a moving body of water.

The apparatus of the present invention comprises means for defining a surface extending from the level of the body of water 210 in a generally upward direction for changing the direction of waves incident thereon from a generally horizontal direction to a generally upward direction. In particular, there is provided adjacent one end of the raft a wall surface portion 212 which extends upwardly from horizontal platform 202 having a bottom portion 213, extending from the level of water 210 at about an acute angle relative to the plane of the body of water, which meets an upper or top portion 214 which is disposed generally vertically. In preferred form the two portions 213 and 214 of wall portion 212 define a relatively smooth and upwardly curved surface, the curve preferably being defined by a quadrant of a circle. The surface of wall portion 212 is shaped to change the direction of flow of waves along body of water 210 from a generally horizontal direction to a generally upward or vertical direction. The vertical portion 214 terminates at a suitable height above the level of the top raft platform 202.

The apparatus of the present invention further comprises means to collect the water or waves which return in a downward direction after having been diverted or deflected upwardly by means of surface 212. There is provided a reservoir or tank 218 having a base or bottom, upstanding sidewalls and an open top. Reservoir 218 is normally positioned so that the open top thereof is at or adjacent the upper end or termination of the surface 212. Reservoir 218 is normally held at this level or position but is movably supported on the raft for movement in a downward direction at various times during the operation of the apparatus as will be described in detail presently. Reservoir 218 is held in the upper position by suitable means such as the latches or holders shown diagrammatically at 222 and 223 in FIG. 7. In the present instance with the upper portion 214 of surface 212 being disposed vertically, the water or waves are thus directed in a vertical direction. Accordingly, the apparatus further comprises means to catch the vertically upwardly directed water as it returns in a vertical downward direction whereupon it is transferred to reservoir 218. The catching means 224 comprises a tray-like collector element having a first portion 226 and a second portion 228 disposed at a right angle to portion 226. Portion 226 is pivotally connected by means of a hinge 230 near the upper end of surface 212. A spring 232 connected at one end to portion 226 and at the other end to surface portion 214 normally holds the catching means 224 in the position shown in solid lines in FIG. 7. Catching means 224 is moved periodically during operation of the apparatus to a position indicated by the broken lines in FIG. 7 in a manner which presently will be described.

The apparatus of the present invention further comprises motive power means operatively connected to the tank or reservoir 218 for converting the potential energy of water collected and stored in reservoir 218 into useful work. The motive power means comprises a plurality of cylindrical housings each supported and depending from the raft and each containing a buoyant ram or piston member adapted for reciprocal vertical movement therein and each ram being operatively connected to reservoir 218. In particular, each motive power means in the apparatus of FIG. 7 includes a cylindrical housing 234 supported by the raft platform 204, having a portion extending thereabove and a portion depending from the raft platform 204. Located within cylinder 234 is a buoyant ram 236 adapted for axial movement along housing 234, in particular, in a vertical direction as viewed in FIG. 7. The ram or piston member is operatively connected by a rod 238 which extends vertically upwardly through the top portion of cylinder 234 and through a suitable opening or aperture in raft platform 202 and which is fixed to the bottom or base of reservoir 218. There is provided at or adjacent the bottom or base of cylinder 234 a conduit 242 and a one-way valve 244, which conduit 242 connects with another conduit 246, which is disposed generally parallel to the raft platforms 202 and 204 but positioned below the bottom of cylinder 234. Valve 244 allows a flow of water in one direction only from the interior of cylinder 234 through conduit 242 and into conduit 246. There is also provided at or adjacent the bottom of cylinder 234 a conduit 248 and a one-way valve 250 which allows a flow of water in one direction only from the body of water 210 into cylinder 234.

As shown in FIG. 7 there is a total of four cylinders 234 and corresponding buoyant rams 236 and connecting rods 238 included in the arrangement of the present illustration, and these elements are identical with identical reference numerals. The particular number of motive power means will vary depending upon the size and power requirements of the particular installation.

The apparatus of FIG. 7 operates in the following manner. The body of water 210 is illustrated as being in a relatively quiescent condition, but as strong waves develop in a left to right direction as viewed in FIG. 7, they are deflected in an upward, generally vertical direction by surface 212. This advantageously allows the force of gravity to be overcome by the waves. The apparatus of the present invention can be substituted for the expensive and heavy breakwaters of earth, rock and concrete conventionally used to protect coastal areas along the oceans from erosion and other wave damage. Another significant advantage of the apparatus of the present invention is that it catches or collects the deflected waves above sea level and converts the potential energy of the collected water into useful work. Reservoir 218 is located so that the open top thereof is positioned to receive the deflected waves as they return in a downward direction. With the upper portion 214 of surface 212 being generally vertical, the catching means 224 is provided to collect the downwardly falling water and transfer it to reservoir 218. In particular, a wave incident on surface 212 is deflected upwardly by the surface, and the force of the wave pivots or flips catching means 224 about pivot 230 to the broken line position shown in FIG. 7. Spring 232 then returns catcher 224 to the initial position where wall 226 is disposed generally horizontally, and in this position catcher 224 collects the wave or water during the downward fall thereof. Then the next wave deflected upwardly pivots catcher 224 again about pivot 230 which transfers water therein from the preceding wave into reservoir 218.

Water is collected in reservoir 218 until it is nearly full whereupon a suitable control means (not shown) is activated to release latches 222 and 223, thereby applying the weight of water in reservoir 218 onto pistons 236 through the rods 238. The control means can be of various forms well known to those skilled in the art, for example a control responsive to the weight of water in reservoir. The weight of water in reservoir 218 forces pistons 236 in a downward direction, this comprising the push or power stroke of the motive power means, which forces or pumps water in the cylinders 234 out through the valves 244 and along conduit 246. When reservoir 218 reaches the end of its movement in a downward direction, valves 254 and 255 are opened to remove water therefrom. When water is removed from reservoir 218, the buoyancy of pistons 236 forces it in an upward direction as water enters the interior of the cylinders 234 through conduits 248 and valves 250. The region in each cylinder between the top thereof and the piston is evacuated, and the vacuum augments the speed of the return stroke. Reservoir 218 thus is returned to its initial position, being held there by latches 222, 223, and is ready to receive more deflected water.

The apparatus of FIG. 7 thus converts the kinetic energy of moving water, i.e., waves, into useful work, i.e., moving or pumping of water along conduit 246. The water pumped in conduit 246 can be used in many ways, for example, in an electricity generation system similar to that of FIG. 4. In such an application conduit 246 would be connected to the input of a tank or reservoir providing the liquid input to a motor such as that designated 10′ in FIG. 4. The raft supporting the apparatus of FIG. 7 can be anchored off shore by means of a fixed or no-give anchor fixed to the surface below the water and connected by a relatively long line to the raft together with one or more movable or give-type anchors connected to the line between the fixed anchor and raft. The horizontal force of a wave acting upon surface 212 causes the movable anchors to be lifted. When the wave force ceases, the movable anchors sink or return to their rest position causing the apparatus to recoil and cut into the next wave. The advantage of this anchoring system is that the force of one wave provides a cutting and deflection force against the next wave.

FIG. 8 illustrates a buoyant ram motor and pump system according to another embodiment of the present invention. The apparatus comprises a raft or platform 260 which is buoyed or floated on a body of water 261 by a buoyant ram motor system located below platform 260. Each motor unit includes guide means comprising a pair of spaced apart parallel rods 262 and 263 depending from platform 260. A buoyant ram member or drum 264, which preferably is hollow cylindrical in shape, is positioned between guide rods 262 and 263 and is movably supported therebetween by sleeve members 265 provided on the outer surface of drum 264, which sleeve members slidably receive rods 262 and 263. Buoyant drum 264 floats in the water and is moved upwardly and downwardly by the waves.

A cylinder 266 is positioned below drum 264 and slidably houses a piston member 268 which is operatively connected to drum 264 by a vertically disposed rod 270 fixed to the drum and piston. Cylinder 266, being below buoyant drum 264, therefore is always submerged and water is admitted to the interior region above piston 268 by a conduit 272 at or near the top of cylinder 266 and containing a one-way valve 274. Water is admitted to the interior region of cylinder 266 below piston 268 by a conduit 276 at or near the bottom of cylinder 266 and containing a one-way valve 278. Water is forced or pumped out from cylinder 266 during the downward stroke of piston 268 through a one-way valve 280 and conduit 282 into a relatively large conduit 284 having a horizontal portion located below the motor units and a vertical portion extending up from the horizontal portion and to the portion of the apparatus above raft 260. Water is forced or pumped out from cylinder 266 during the upward stroke of piston 268 through a conduit 286 and one-way valve 288 into conduit 284.

A plurality of motor units would be provided below raft 260, the particular number being determined by such factors as the size and power requirements of the installation. The motion of the waves in the water 261 causes the buoyant drums to move up and down, thereby pumping water along conduit 284. In particular, as drum 264 moves downwardly with a wave, piston 268 forces water from cylinder 266 out valve 280 and conduit 282 and into conduit 284 while water enters cylinder 266 through conduit 272 and valve 274, thereby filling the region above piston 268. When the drum 264 then moves upwardly with the wave, piston 268 forces water above it out through conduit 286 and valve 288 into conduit 284 while water enters the interior of cylinder 266 below piston 268 through conduit 276 and valve 278 in preparation for the next downward stroke of piston 268.

The foregoing operation occurs in each motor unit, although the particular movements of the individual buoyant drums and pistons will be at different stages of the pumping cycle depending on the location of the respective motor units relative to the waves. The water pumped through conduit 284 can be utilized for doing useful work, such as operating an electricity generating system similar to the system of FIG. 4 and carried by raft 260.

Conduit 284 leads to a tank or reservoir 290 supported above raft 260 and which has an outlet connected to a buoyant ram motor and pump 10'' identical to motor 10' in the system of FIG. 4 and supported on raft 260. The water in tank 290 serves the same purpose as water 18' in the system of FIG. 4. An outlet for motor 10'' includes a conduit 292 containing a control valve 294. The remainder of the electricity generating system carried above raft 260 is identical in construction and operation to the system of FIG. 4. Thus water is pumped by motor 10'' up conduit 80' to reservoir 86', supported at a relatively great height above raft 260, from which it is dropped through a conduit 88' and through a turbine generator 90' to generate electricity and then through a conduit 100' to a reservoir 102' from which it is withdrawn through conduit 112' for further pumping.

In the apparatus of FIG. 8. The float level of the raft 260 is determined by the buoyancy of the drums 264. In order to achieve uniform lift the buoyant drums 264 are weighted so that the forces in upward and downward directions are equal. The relatively large conduit 284 disposed below the motor units helps to stabilize the structure. The apparatus of FIG. 8 works advantageously with relatively large waves and can be located relatively far from a shore, and it can be used advantageously in conjunction with the apparatus of FIG. 7 which works well with relatively smaller waves and would be located relatively closer to the shore.

Figure 9:
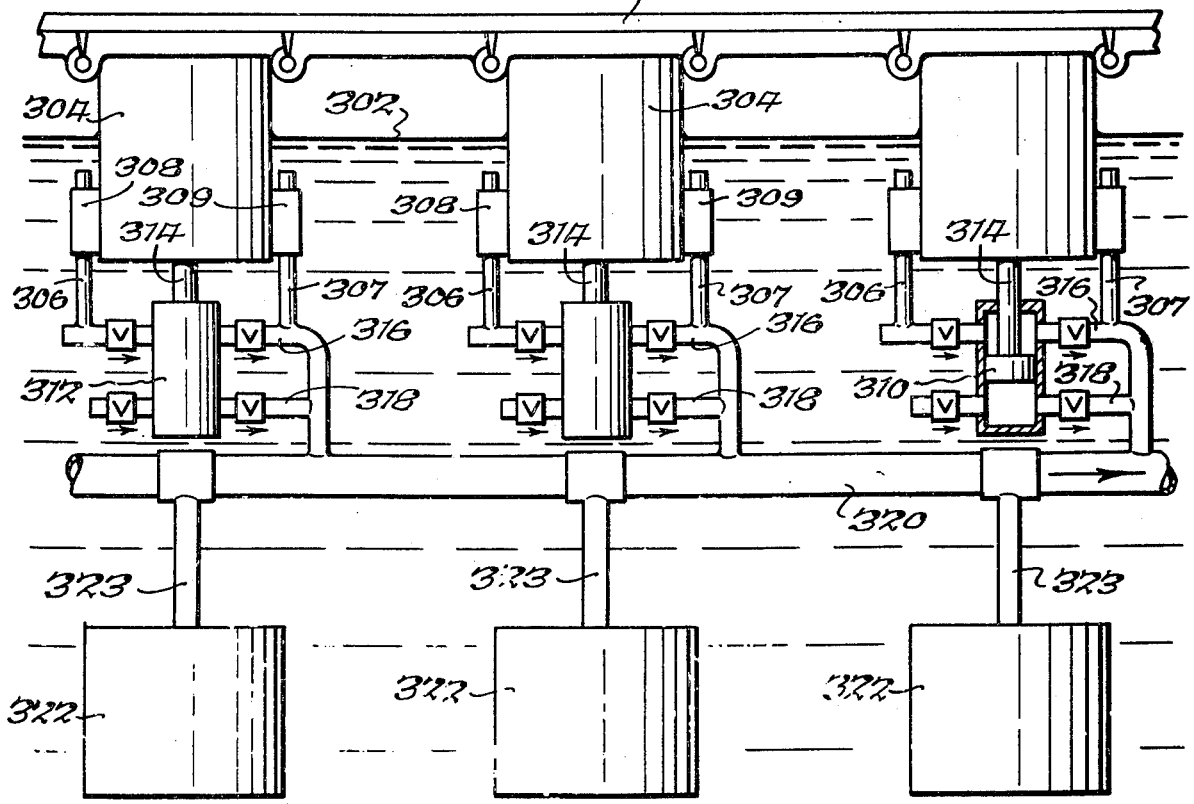
FIG. 9 is a partially sectional view, partly diagrammatic, of a buoyant ram motor and pumping system according to another embodiment of the present invention.

FIG. 9 illustrates a buoyant ram motor and pumping system according to another embodiment of the present invention. A bridge 300 is buoyed or floated on a body of water 302 which it spans by an arrangement which converts the weight of vehicles and the like crossing bridge 300 into useful work. A buoyant tank 304 fixed to and depending from bridge 300 is supported for vertical movement between a pair of rods 306 and 307 slidably received in sleeves 308 and 309 fixed to opposite sides of tank 304. A piston 310 movable within a cylinder 312 is fixed by a rod 314 to the base or bottom of tank 304. Movement of tank 304 up and down causes the arrangement of piston 310 and cylinder 312 to pump water during the upward and downward strokes from cylinder 312 through conduits 316 and 318, respectively, in a manner identical to the operation of cylinder 266 and piston 268 in the apparatus of FIG. 8. Upward and downward movement of tank 304, however, is provided by the weight of vehicles and the like moving along bridge 300. Water pumped out conduits 316 and 318 is pumped through a main conduit 320 for doing useful work, as in the preceding examples. The foregoing arrangement is buoyantly supported by suitably dimensioned and weighted buoyant drums 322 connected through members 323 to conduit 320, whereby the entire bridge and pumping system will rise or fall slightly with changing levels of the river or body of water 302 to compensate for the same. A plurality of buoyant tanks 304 and associated motor units are positioned along and beneath bridge 300, the exact number depending upon the length of bridge 300.

It is therefore apparent that the present invention accomplishes its intended objects. While several embodiments of the present invention have been described in detail, this is for the purpose of illustration, not limitation.

I claim:
1. A buoyant ram motor comprising:
   a. a housing capable of retaining liquid;
   b. a buoyant ram positioned within said housing for reciprocal movement in a generally vertical direction;
   c. controlled passage means for admitting liquid from a source into said housing beneath said buoyant ram and for removing liquid from said housing beneath said ram;
   d. means for providing a vacuum in the region of said housing over said ram; and
   e. means for coupling said ram to a mechanical load;
   f. whereby during each cycle of operation of said motor liquid first is admitted to said housing below the buoyant ram, thereby forcing said ram in an upward direction and then liquid is removed from said housing below said ram, thereby returning said ram in a downward direction.

* * * * *